(12) United States Patent
Jourdan (10) Patent No.: US 7,836,807 B2
(45) Date of Patent: Nov. 23, 2010

(54) CANTED AND VERTICAL BLADE ASSEMBLY

(75) Inventor: James K. Jourdan, Fond du Lac, WI (US)

(73) Assignee: Marvel Manufacturing Company, Inc., Oshkosh, WI (US)

( * ) Notice: Subject to any disclaimer, the term of this patent is extended or adjusted under 35 U.S.C. 154(b) by 388 days.

(21) Appl. No.: 11/572,257

(22) PCT Filed: Mar. 24, 2006

(86) PCT No.: PCT/US2006/010572

§ 371 (c)(1),
(2), (4) Date: Jan. 17, 2007

(87) PCT Pub. No.: WO2007/111579

PCT Pub. Date: Oct. 4, 2007

(65) Prior Publication Data

US 2009/0071311 A1    Mar. 19, 2009

(51) Int. Cl.
*B27B 13/16* (2006.01)

(52) U.S. Cl. .......................................... 83/811; 83/788

(58) Field of Classification Search ........... 83/809–813, 83/788, 794, 522.11, 814, 471.3, 477.1, 486.1, 83/807, 820, 821, 829, 823; 144/2.1, 3.1, 144/1.1

See application file for complete search history.

(56) References Cited

U.S. PATENT DOCUMENTS

| | | | |
|---|---|---|---|
| 31,768 A | 3/1861 | Sullenberger et al. | |
| 113,926 A * | 4/1871 | Pryibil | 83/811 |
| 442,420 A * | 12/1890 | Coan | 83/812 |
| 490,212 A * | 1/1893 | O'Connor | 83/812 |
| 798,519 A * | 8/1905 | Manning | 83/811 |
| 936,596 A * | 10/1909 | Anderson | 83/811 |
| 1,302,949 A * | 5/1919 | Meyers | 83/812 |
| 2,644,491 A * | 7/1953 | Abraham | 83/811 |
| 2,664,118 A * | 12/1953 | Krumbach | 83/817 |
| 2,711,196 A | 6/1955 | Daniel | |
| 2,744,547 A * | 5/1956 | Sevetz, Sr. | 83/811 |
| 3,801,089 A * | 4/1974 | Fukugami et al. | 83/74 |
| 4,355,557 A * | 10/1982 | Mecsey | 83/565 |
| 4,882,962 A * | 11/1989 | Terpstra et al. | 83/812 |
| 4,903,561 A * | 2/1990 | De Varreux | 83/811 |
| 5,103,704 A * | 4/1992 | Spath et al. | 83/452 |

(Continued)

FOREIGN PATENT DOCUMENTS

JP     06246701 A  *  9/1994

*Primary Examiner*—Ghassem Alie
(74) *Attorney, Agent, or Firm*—Joseph S. Heino; Patrick M. Bergin (57) ABSTRACT

The present invention provides for a vertical band saw frame assembly having a support column having a top and a bottom, the support column having a lower band wheel attached thereto. The band saw frame further provides for a tilt plate having a plurality of apertures attached to the top of the support column and a mounting plate. The tilt plate provides a mounting platform for the upper band wheel, blade tensioning assembly, blade guide, and blade break sensor. In a preferred embodiment, the tilt plate is attachable to the mounting plate in two positions, a first position in vertical alignment with the lower band wheel and a second position in which the upper band wheel further from the support column and at an angle to the first position to create a canted cutting blade angle.

4 Claims, 6 Drawing Sheets

U.S. PATENT DOCUMENTS

| | | |
|---|---|---|
| 5,320,016 A | 6/1994 | Spath et al. |
| 5,845,410 A * | 12/1998 | Boker .......................... 33/536 |
| 6,711,780 B2 * | 3/2004 | Lee ............................. 16/326 |
| 6,920,816 B2 * | 7/2005 | Chiang ........................ 83/812 |
| 2007/0137456 A1 * | 6/2007 | Liao ............................ 83/788 |

* cited by examiner

CANTED AND VERTICAL BLADE ASSEMBLY

FIELD OF THE INVENTION

This invention relates generally to sawing machines, band saws, including vertical band saws with power tilting capabilities. More specifically, this invention relates a mechanism for providing both a canted and a vertical cutting blade.

BACKGROUND OF THE INVENTION

Sawing machines, including vertical band saws having tilting frames and mechanisms and controllers for changing the angle of tilt of the saw blade, are known in the art. A saw and wide sweep tilting mechanism of this general type is described and claimed in U.S. Pat. No. 6,601,494, issued to Jourdan, the disclosure of which is incorporated herein by reference.

Vertical cutting blades are very effective in cutting round stock. Vertical cutting blades are also very important to "notching" operations. Notching operations are, generally, cutting operations in which a first cut must match a second cut and are employed if, for example, a section must be removed from a work piece. In such a situation, a first cut is made into the work piece. A second cut is then made that meets the first cut, thereby removing that portion cut out of the work piece. Obviously, a vertical cutting blade is required, or the first cut and second cut would not completely match, leading to either an incomplete cut of the work piece or an overcut of the work piece.

However, if notch cuts are not required and the work pieces to be cut present a flat vertical surface to the cutting blade, then a forward canted blade is very advantageous. A canted blade cuts a more consistent cutting area, thus achieving a faster cut rate and better blade life. Additionally, a canted blade is much less likely to "walk" when confronted with a vertical cutting surface, and is therefore more likely to produce a straight cut. Additionally, a forward canted blade does not reduce the effectiveness of the band saw when cutting round stock.

Currently, saws are sold as either vertical cutting blades or forward canted cutting blades. Thus, users of the saws must determine in advance what their primary needs are and then select between the vertical or forward canted saws, or purchase both types of saws.

Therefore, what is needed is a simple and inexpensive means for manufacturing band saws, including vertical band saws that are capable of providing both a forward canted blade and a standard vertical blade. What is also needed is a vertical band saw that is variably adjustable between a vertical blade and a forward canted blade position. Lastly, to reduce assembly lead time, assembly of the band saw should not be unduly complicated by the addition of such means for providing both a forward canted and a vertical band saw blade.

SUMMARY OF THE INVENTION

The present invention provides for a vertical band saw frame assembly comprising a support column having a top and a bottom, the support column having a lower band wheel attached thereto. The band saw frame further provides for a mounting plate having a plurality of apertures attached to the top of the support column and a tilt plate. The tilt plate provides a mounting platform for the upper band wheel, blade tensioning mechanism, guide arm, and blade break proximity sensor. In a preferred embodiment, the tilt plate is movable between two positions. That is, the tilt plate provides a first plurality of apertures complementary to those in the mounting plate. The first plurality of apertures is positioned to place the upper band wheel in a first position in vertical alignment with the lower band wheel. The tilt plate further provides a second plurality of apertures positioned to place the upper band wheel in a second position. The second plurality of apertures is also complementary to those in the mounting plate, but positioned to move the upper band wheel further from the support column. The second plurality of apertures is also oriented at an angle in relation to the first plurality of apertures. The second plurality of apertures may also lower the upper band wheel slightly so as to preserve the center to center distance between the upper band wheel and the lower band wheel.

While the exact forward cant angle created by moving the upper band wheel away from the support column is not intended to be a limitation of this invention, the angle created by a line drawn from the center of the lower band saw wheel to the center of the upper band saw wheel when the second plurality of apertures are in use is approximately three (3) degrees from vertical. However, it is recognized that a range of angles, such as between two and ½ (2.5) degrees and three and ½ (3.5) degrees from vertical or even between one (1) degree and 10 (10) degrees from vertical would served the intended purpose.

An important feature of the preferred embodiment is that the tilt plate can be unsecured and moved from its first position to its second position relatively and resecured (or vice versa) relatively rapidly for changes between using the saw as a vertical cutting blade and a forward canted cutting blade. Shoulder bolts and receiving sockets provide precise location and alignment of the tilt plate in both first and second positions so no measurements or adjustments are necessary. Relocation of the individual components is unnecessary because the band wheel, tensioner, guide arm, and blade break switch are all attached to the tilt plate, A preferred embodiment of the present invention also provides for a means for adjusting the tension of the band saw blade. In a preferred embodiment, the blade tensioner is attached to the tilt plate by a blade tensioner support frame.

In general, vertical band saws employ a blade that must be turned ninety (90) degrees in the cutting area. Therefore, the present invention further provides for upper and lower band saw blade guides that are attached to the tilt plate via a vertically adjustable guide arm and the lower band saw housing, respectively. The lower blade guide is generally attached to the lower band saw wheel housing via a bracket having a first set of apertures for use when the upper band wheel is in the first position and a second set of apertures for use when the upper band wheel is in the second position. The upper blade guide is attached and aligned to the tilt plate via a vertically adjustable guide arm sliding on a guide integral to the tilt plate The guide arm is adjusted to locate the blade guide as close as possible to the workpiece. The foregoing and other features of the canted and vertical blade mechanism of the present invention will be apparent from the detailed description that follows.

DETAILED DESCRIPTION

Figure 1:
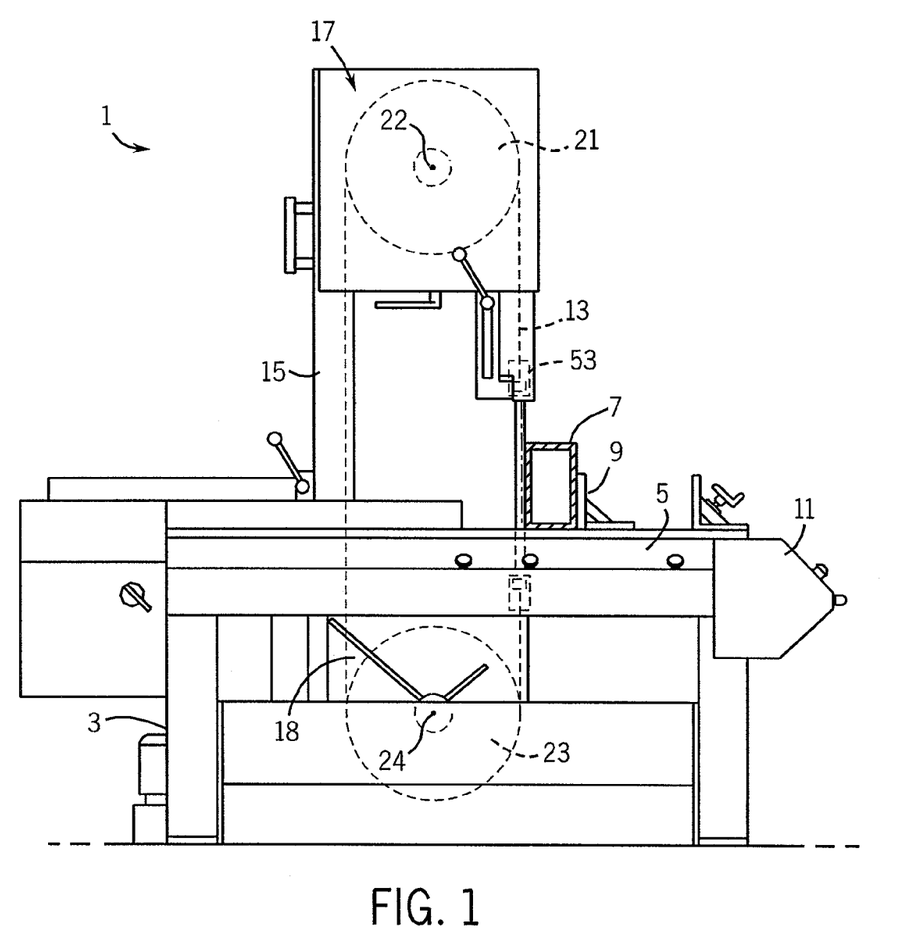
FIG. 1 is a side elevational view of the canted and vertical band saw in the vertical cutting position constructed in accordance with the principles outlined herein.
Figure 3:
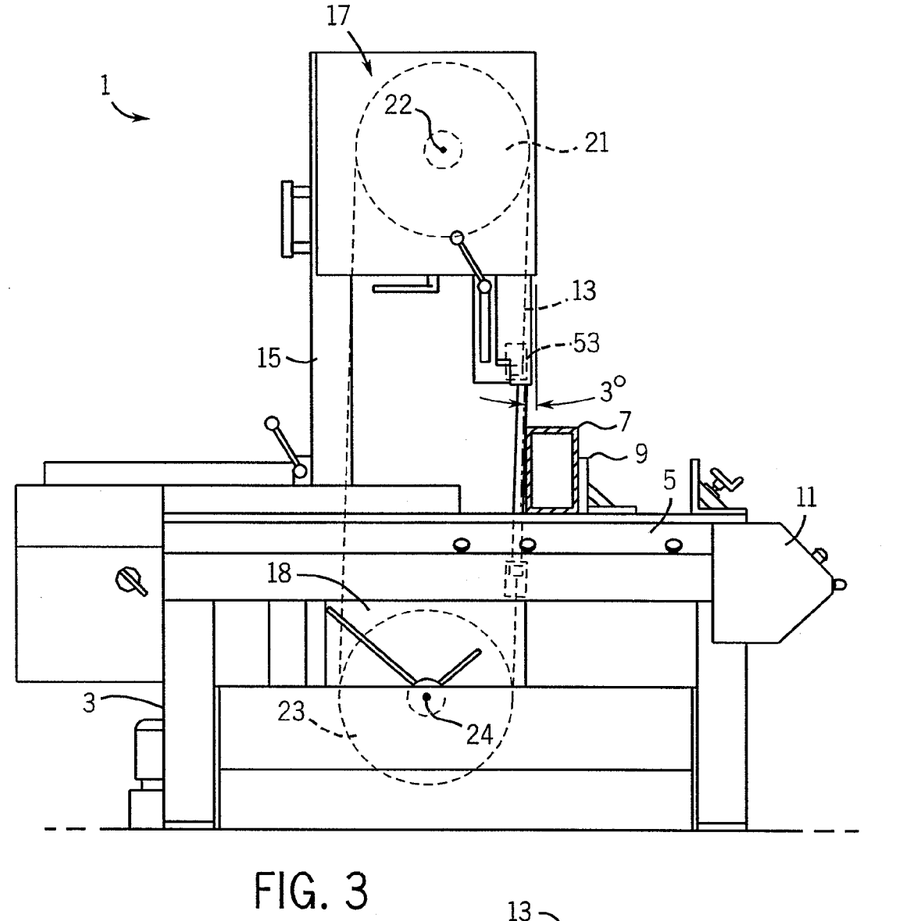
FIG. 3 is a side elevational view of the canted and vertical band saw described in the forward canted cutting position.

Referring now to the drawings in detail, wherein like numerals refer to like references and elements throughout, FIGS. 1 and 3 show the vertical band saw 1 in both the vertical cutting position (FIG. 1) and the forward canted cutting position (FIG. 3). As shown in FIG. 1, base 3 supports work table 5, which shows work piece 7 clamped by vise 9. A control panel 11 is mounted on the based 3. As the details of the control panel 11 are not important to the present invention, they are not discussed here. For an example of such details, the reader is referred to U.S. Pat. No. 4,658,689, which is hereby incorporated by reference.

In general, a hydraulic system comprising an electric motor, a hydraulic pump, a hydraulic fluid reservoir, control valves, filter and associated piping is provided to operate the vises 9, stock in feed and forward and rearward motion of the saw frame 16, tensioner assembly 33, and other hydraulic functions. The hydraulic system is situated in a hydraulic compartment (not shown) within the base 3. As specific details of the hydraulic system are not important to the present invention, they are also not further discussed here.

Figure 5:
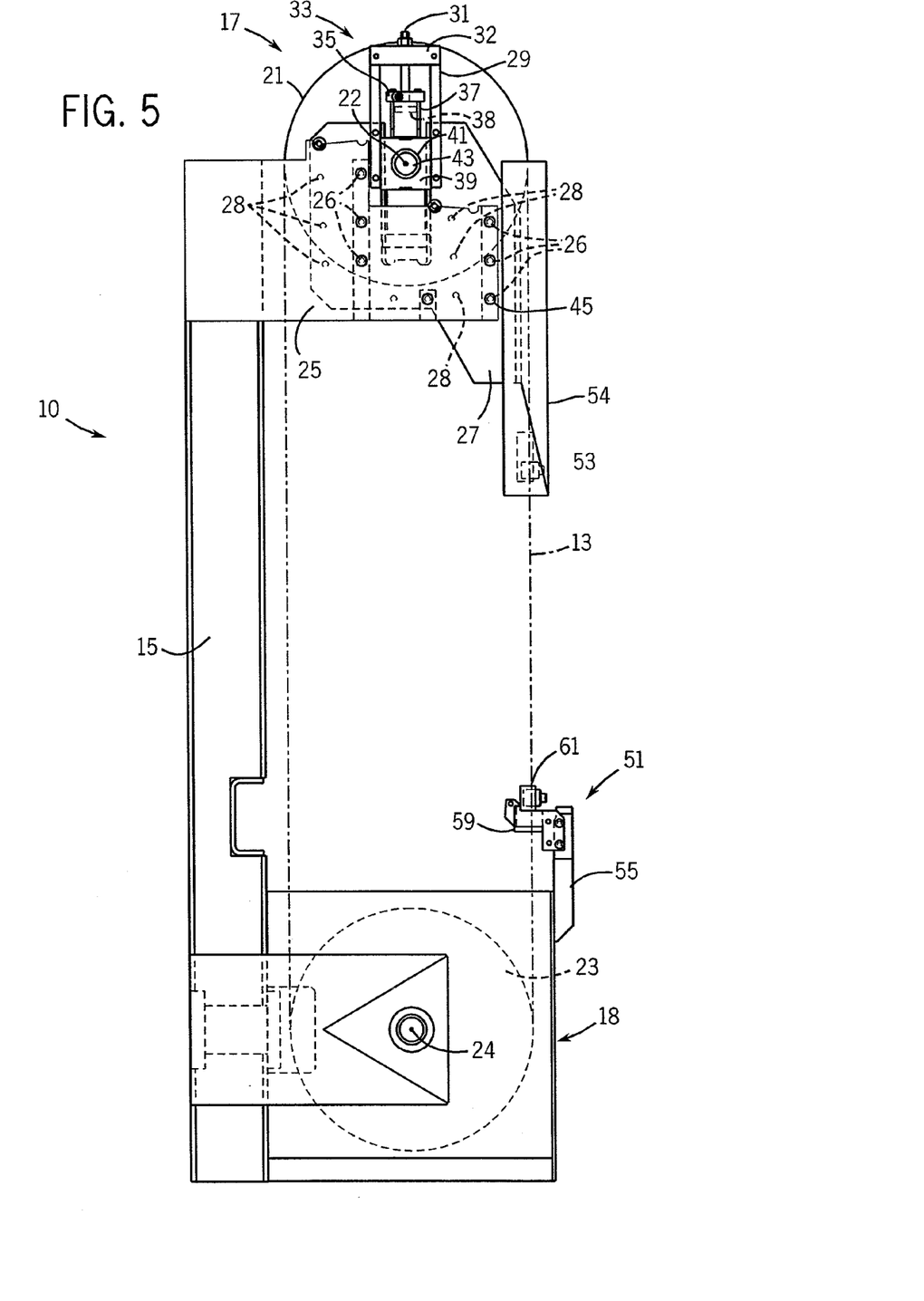
FIG. 5 is a side elevational view of the vertical band saw assembly having the upper band wheel in the vertical position
Figure 6:
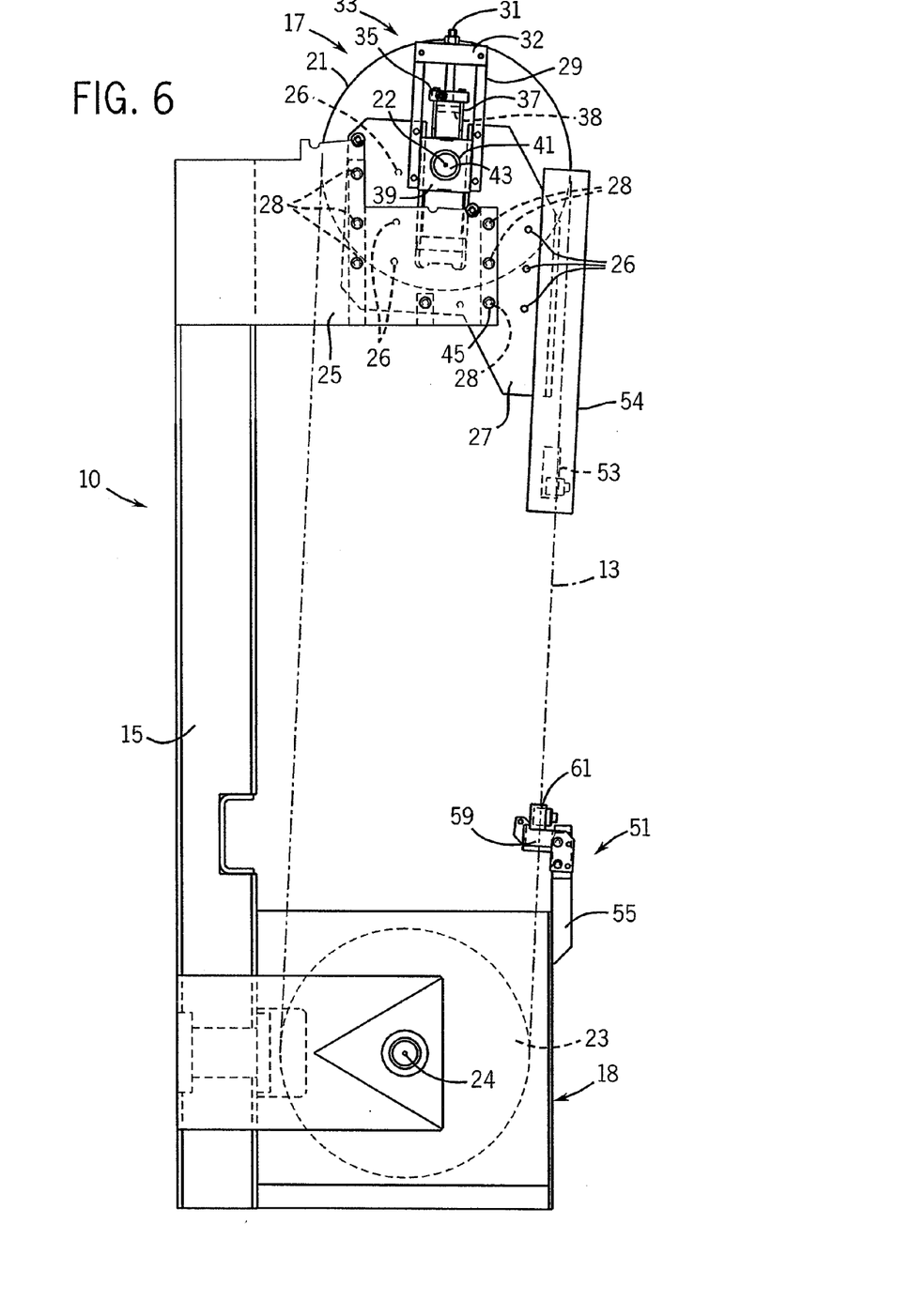
FIG. 6 is a side elevational view of the vertical band saw assembly having the upper band wheel in the canted position.

As shown in FIGS. 5 and 6, the saw frame assembly 10 is comprised of support column 15 that connects the upper saw frame assembly 17 to the lower saw frame assembly 18. The lower saw frame assembly 18 preferably comprises a blade drive motor (not shown) and variable speed transmission housing (not shown), the blade drive motor being operable to drive a variable speed transmission, thereby driving the lower band wheel 23.

Figure 2:
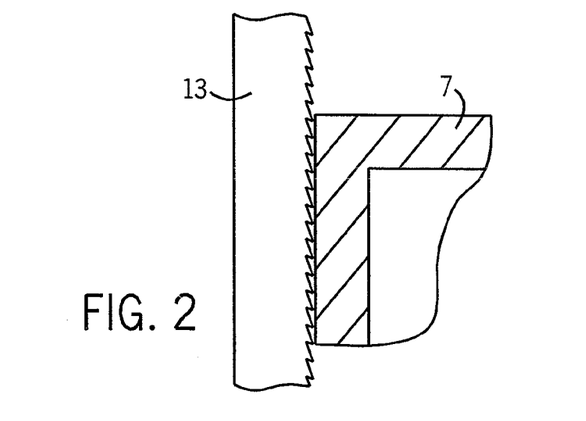
FIG. 2 is an enlarged side elevational view of the blade of the vertical band saw and a work piece shown in FIG. 1
Figure 4:
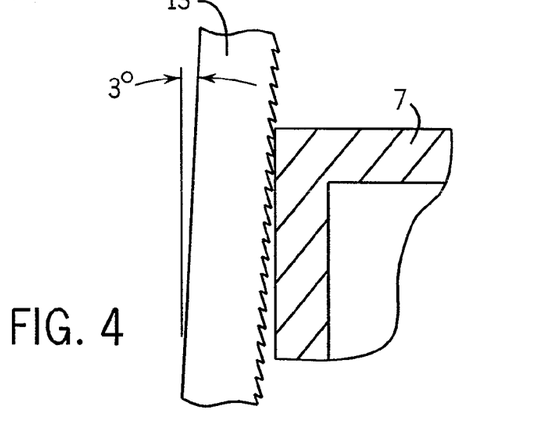
FIG. 4 is an enlarged side elevational view of the blade of the vertical band saw and work piece shown in FIG. 3.

Referring now to FIGS. 3 and 4, which the show the canted blade in more detail. As shown in outline in FIG. 3, the upper band wheel 21 is slightly offset from that shown in FIG. 1. FIG. 4 shows the advantageous angle of the saw blade 13 as it enters rectangular work piece 7, in comparison to the blade angle shown in FIG. 2. FIGS. 5 and 6 provide a more detailed view of the preferred embodiments of the saw frame assembly 10. In particular, FIG. 5 shows the saw blade 13 in its vertical position, while FIG. 6 shows the saw blade 13 in its forward canted position.

As shown in FIGS. 5 and 6, the saw frame assembly 10 comprises the support column 15, the upper saw frame assembly 17 and the lower saw frame assembly 18. In further detail the band saw frame assembly 10 comprises a support column 15, lower saw frame assembly 18 and the upper saw frame assembly 17. As shown in more detail in FIG. 7, the upper saw frame assembly 17 comprises a mounting plate 25, the mounting plate 25 being rigidly attached to the support column 15. The upper band wheel 21 is attached to the mounting plate 27 via the tensioner assembly 33.

As previously discussed, vertical band saw blades 13 are well adapted to cut circular items using a perfectly vertical cutting angle such as is shown in FIG. 5. However, as discussed above, in cutting non-circular items, a forward canted band saw blade 13 is advantageous. Therefore, the present invention provides for a tilt plate 27 interposed between the mounting plate 25 and the tensioner assembly 33. The tilt plate 27 is attachable to the mounting plate 25 in a first position designed to provide a vertical cutting blade and a second position designed to provide a cutting blade angle of approximately three (3) degrees from vertical. As shown in FIG. 5, the tilt plate 27 is in its first, or zero (0) degree position, which provides for no forward cant. FIG. 6 shows the tilt plate 27 installed on the mounting plate 25 at its second, canted position.

The present invention may provide for a tensioner assembly 33 attached to the tilt plate 27 by a cylinder support frame 29 which is attached to the tilt plate 27 via a number of fasteners 31. The cylinder support frame 29 further comprises a top beam 32, the top beam 32 having an aperture there through. The piston rod 31 is inserted through the aperture in the top beam 32.

The piston rod 31 suspends a hydraulic cylinder 37 and piston 38 within the cylinder support frame 29. The hydraulic cylinder 37 has a cylinder cap 35 that permits the entry and/or exit of hydraulic fluid, thus raising and/or lowering the level of the piston 38 within the hydraulic cylinder 37. The hydraulic cylinder 37 is fixably attached to the bearing housing 39. Thus, as more hydraulic fluid enters the cylinder 37 through the cylinder cap 35, thus expanding the distance between the piston 38 and the cylinder cap 35, the bearing housing 39 rises. The bearing housing 39 contains a bearing 41 that supports the band wheel shaft 43. The band wheel shaft 43 supports the upper band wheel 21. Although hydraulic tensioner assembly 33 is described and shown in this application, the type of tensioner shown in the drawings and described herein in detail is not meant to limit the invention and is rather to serve as an example of a preferred embodiment. Another type of tensioner that may be employed in conjunction with the present invention is a screw-type tensioner.

As discussed briefly above, FIG. 5 shows the tilt plate 27 and upper band wheel 21 in the first position using the first set of apertures 26. A plurality of fasteners 45 is used to attach the tilt plate 27 to the mounting plate 25. Also shown in FIG. 5 is the second set of apertures 28 or, in this embodiment, the three (3) degree apertures 28 in the tilt plate 27. As shown, the second set of apertures 28 are offset from the first set of apertures and are set at an angle from the first set of apertures. While the angle described and shown in FIGS. 3 and 4 is a three (3) degree angle, it is possible to use a range of angles between one (1) degrees and ten (10) degrees. However, applicant has found that a three (3) degree angle works particularly well in practice.

When the tilt plate 27 is in the second position, that is, the second set apertures 28 in the tilt plate 27 are employed, the tilt plate 27 is moved outwardly from the support column 15 a distance so as to create enough offset between the upper band wheel 21 and the lower band wheels 23 to create a three (3) degree blade angle against a vertical work piece 7 as is shown in FIGS. 3 and 4. The precise offset distance required to create a particular blade angle can be determined via the laws of trigonometry. That is, given the required center distances between the upper band wheel 21 and the lower band wheel 23 and a desired cant angle, e.g. three (3) degrees, one determine the horizontal offset required from the vertical, or first upper band wheel position.

An important feature of the preferred embodiment is that the tilt plate 27 can be unsecured and moved from its first position to its second position relatively and resecured (or vice versa) relatively rapidly. With that in mind, an embodiment of the invention provides two positioning pins (shoulder bolts) 67 and 68 attached to the tilt plate 27. Aperture 70 and 71 and the bolt 69 are part of the hole patterns 26 and 28 referenced above. The mounting plate 25 provides notches 73 and 74 that permit the positioning of the tilt plate 27 using either the first position notches 73 or the second position notches 74 in the mounting plate 25 against the upper positioning pins 67, 68.

Figures 7, 8, 11:
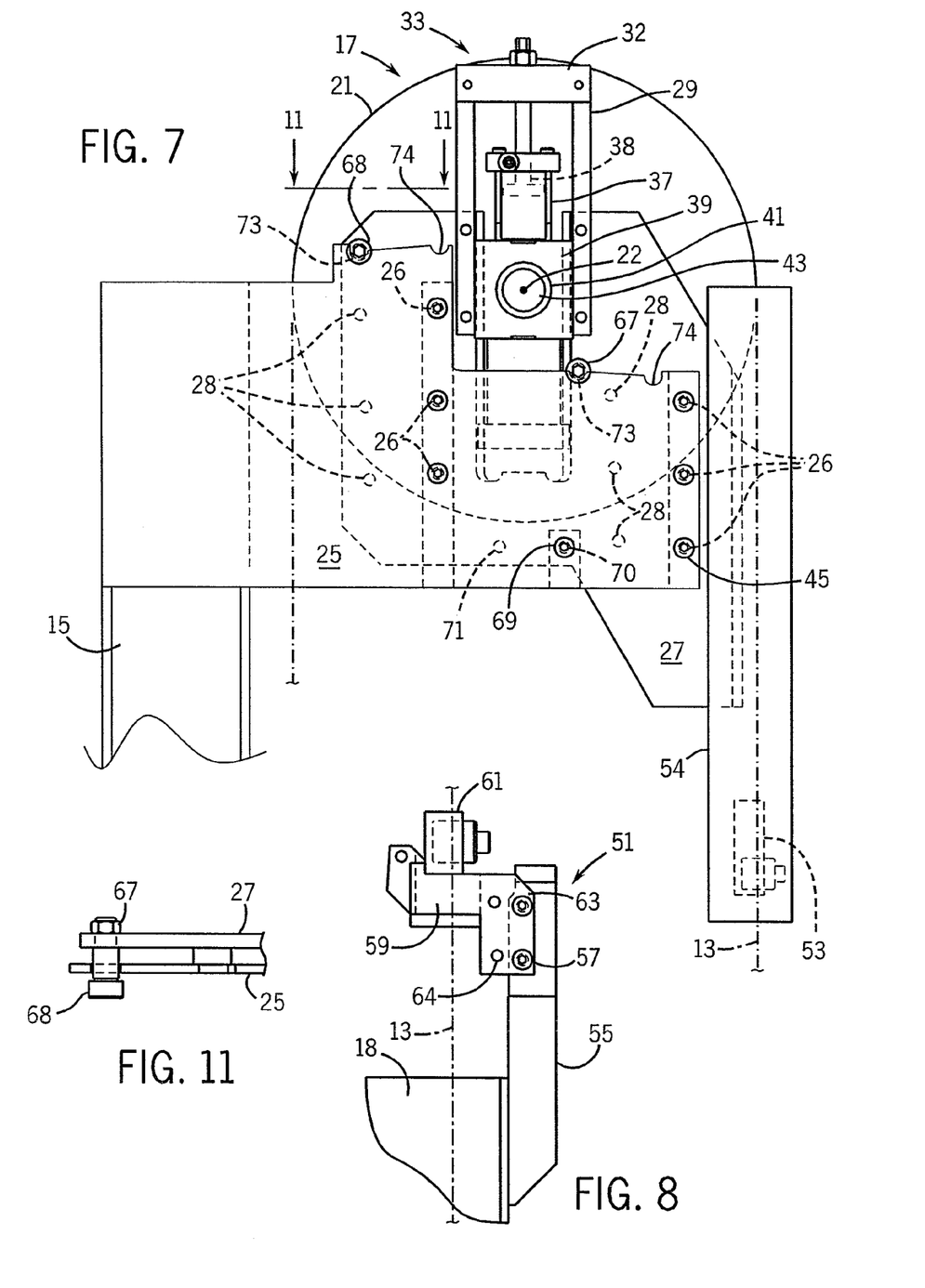
FIG. 7 is a side elevational view of the upper band wheel tensioner assembly shown in the vertical blade orientation employed on the vertical band saw of the present invention.
FIG. 8 is a side elevational view of a band saw lower blade guide assembly shown in the vertical blade orientation.
FIG. 11 is a partial top plan view of the mounting plate and the tilt plate of the upper band wheel assembly.

Typically, blade guides 51, 53 are provided to rotate the band saw blade 90 degrees in the cutting area and then to rotate the band saw blade back 90 degrees such that it wraps around the upper and lower band saw wheels 21, 23. As may be expected, if the upper band wheel 21 is offset, the upper and lower band saw blade guide 51, 53 must also be offset. The upper blade guide 53 is attached to the tilt plate 27 via guide arm 54. As is known in the art, the guide arm 54 is permitted to slide upwardly and downwardly with respect to the tilt plate 27 to allow adjustment for differing work piece 7 size. Therefore, as shown in FIGS. 5 and 6, when the tilt plate 27 is moved between the first and second positions, the angle of the guide arm 54 and the upper blade guide 53 is changed accordingly. FIG. 8 shows a lower band saw blade guide 51 as may be used with the present invention. Therefore, as with the tilt plate 27, the lower blade guide assembly 51 has two sets of mounting apertures.

As shown in FIG. 8, the lower blade guide assembly 51 is comprised of a vertical support post 55. The vertical support post 55 is mounted on the lower saw frame assembly 18. The vertical support post 55 contains a pair of apertures 57 (the apertures are shown only as having fasteners within them). The lower blade guide assembly 51 further comprises a bracket 59. The bracket 59 provides a mounting point for the blade guide 61. There are many different types of blade guides that would function with the preferred embodiment and this invention is not to be construed as limited in any way by the blade guide 61 selected.

Figures 9, 10:
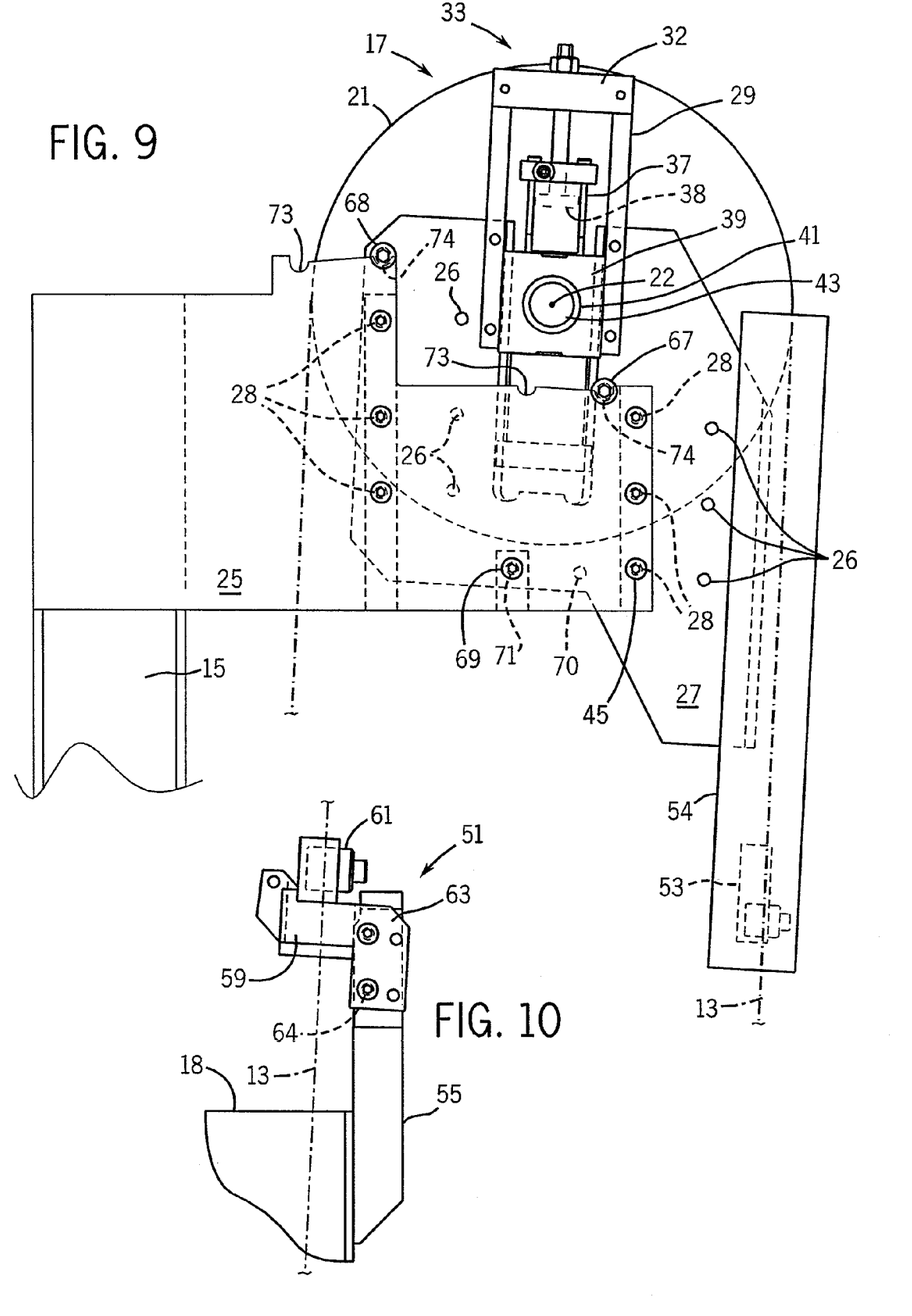
FIG. 9 is a side elevational view of the upper band wheel tensioner assembly shown in the canted blade orientation employed on the vertical band saw of the present invention.
FIG. 10 is a side elevational view of a band saw lower blade guide assembly shown in the canted blade orientation as it is employed in conjunction with FIG. 9.

The bracket 59 provides two sets of apertures 63 and 64 which are shown in both FIGS. 8 and 10. FIG. 8 shows the bracket 59 installed on the on the vertical support post 55 in the vertical blade guide position using vertical apertures 63. FIG. 10 shows the blade guide 51 installed using the canted apertures 64.

Although a preferred embodiment of the invention has been disclosed above, it will be understood that modifications may be made within the spirit and scope of the invention. Accordingly, it is intended that the invention no be limited by the foregoing description but solely by the scope of the appended claims.

What is claimed is:

1. A band saw frame assembly comprising:
   a band saw frame;
   a support column attached to the band saw frame having a top and a bottom;
   a lower band wheel attached to the bottom of the support column;
   a mounting plate having a plurality of apertures attached to the top of the support column;
   a tilt plate comprising a first plurality of apertures complementary to those in the mounting plate positioned to place an upper band wheel attached to the tilt plate in a first position in vertical alignment with the lower band wheel and a second plurality of apertures complementary to the apertures in the mounting plate but being offset from the first plurality of apertures to move the upper band wheel to a second position further from the support column, the second plurality of apertures also being oriented at an angle in relation to the first plurality of apertures;
   a band saw blade comprising a cutting edge and an opposite back edge, said band saw blade installed around the upper band saw wheel and the lower band saw wheel, the band saw blade being vertical when the upper band wheel is in the first position and, when the upper band wheel is in the second position, the band saw blade being angled approximately 3 degrees from vertical in a direction opposite the direction of the support column such that the blade is canted forwardly so that the back edge of the blade which is coplanar with the vertical is angled approximately 3 degrees with respect to the vertical to cut into the top of the leading edge of a workpiece being cut; and
   a plurality of fasteners, the fasteners being used to fasten the tilt plate to the mounting plate.

2. The band saw frame assembly of claim 1 wherein the upper band wheel is attached to the tilt plate by a blade tensioner assembly.

3. The band saw frame assembly of claim 1 wherein the upper blade guide is rigidly attached to the tilt plate.

4. The band saw frame assembly of claim 1 further comprising a lower blade guide assembly attached to a lower band wheel housing, the lower blade guide assembly comprising a first set of apertures for use when the upper band wheel is in the first position and a second set of apertures both offset from and at an angle to the first set of apertures for use when the upper band wheel is in the second position.

* * * * *